(12) United States Patent
Wang et al.

(10) Patent No.: US 11,815,625 B2
(45) Date of Patent: Nov. 14, 2023

(54) METHODS AND DEVICES FOR CORRECTING UNDERWATER PHOTON DISPLACEMENT AND FOR DEPTH SOUNDING WITH SINGLE-PHOTON LIDAR

(71) Applicant: China University of Geosciences, Wuhan, Wuhan (CN)

(72) Inventors: lizhe Wang, Wuhan (CN); yifu Chen, Wuhan (CN); yuan Le, Wuhan (CN); gang Chen, Wuhan (CN); weitao Chen, Wuhan (CN); yusen Dong, Wuhan (CN)

(73) Assignee: China University of Geosciences, Wuhan, Wuhabn (CN)

( * ) Notice: Subject to any disclaimer, the term of this patent is extended or adjusted under 35 U.S.C. 154(b) by 545 days.

(21) Appl. No.: 17/029,092

(22) Filed: Sep. 23, 2020

(65) Prior Publication Data
US 2021/0003668 A1    Jan. 7, 2021

(30) Foreign Application Priority Data

May 26, 2020 (CN) .......................... 202010452608.3
Aug. 24, 2020 (CN) .......................... 202010855797.9

(51) Int. Cl.
*G01S 7/48* (2006.01)
*G01B 11/22* (2006.01)
(Continued)

(52) U.S. Cl.
CPC ............ *G01S 7/4808* (2013.01); *G01B 11/22* (2013.01); *G01S 7/4865* (2013.01); *G01S 17/10* (2013.01)

(58) Field of Classification Search
CPC ...... G01S 7/4808; G01S 7/4865; G01S 17/10; G01B 11/22
See application file for complete search history.

(56) References Cited

U.S. PATENT DOCUMENTS

| | | | | |
|---|---|---|---|---|
| 6,836,285 | B1 * | 12/2004 | Lubard | G01S 7/487 348/81 |
| 2011/0271752 | A1 * | 11/2011 | Ullrich | G01C 13/008 73/170.29 |
| 2017/0234973 | A1 * | 8/2017 | Axelsson | G01S 7/4861 356/5.01 |

FOREIGN PATENT DOCUMENTS

| | | | | |
|---|---|---|---|---|
| CN | 106199562 | A * | 12/2016 | G01S 17/42 |
| CN | 109752727 | A * | 5/2019 | |

OTHER PUBLICATIONS

F. Yang, D. Su, Y. Ma, C. Feng, A. Yang and M. Wang, "Refraction Correction of Airborne LiDAR Bathymetry Based on Sea Surface Profile and Ray Tracing," in IEEE Transactions on Geoscience and Remote Sensing, vol. 55, No. 11, pp. 6141-6149, Nov. 2017, doi: 10.1109/TGRS.2017.2721442. (Year: 2017).*

(Continued)

*Primary Examiner* — Isam A Alsomiri
*Assistant Examiner* — Joseph C Fritchman

(57) ABSTRACT

Methods and devices for correcting underwater photon displacement and for depth sounding with a single-photon Lidar are provided. The method includes: acquiring a pointing angle of a photon emitted by the single-photon Lidar, and coordinates of a water-surface photon signal and a water-bottom photon signal returned by the photon emitted by the single-photon Lidar; performing a sea wave fitting according to the water-surface photon signal to determine a sea wave model; determining an intersection of the photon and an air-water interface according to coordinates of any water-bottom photon, the pointing angle and the sea wave model; determining an underwater displacement error of the photon according to the intersection, the sea wave model and the pointing angle; and correcting the coordinates of the water-bottom photon according to the underwater displacement error. The invention performs sea wave modeling (Continued)

through water surface photon signal and determines intersection of the photon and water-air interface.

9 Claims, 12 Drawing Sheets

(51) Int. Cl.
    *G01S 7/4865*     (2020.01)
    *G01S 17/10*     (2020.01)

(56) References Cited

OTHER PUBLICATIONS

Garby, B. "The Effect of Ocean Waves on Airborne Lidar Bathymetry", University of Colorado, Boulder, ProQuest Dissertations And Theses; Thesis (M.S.)—University of Colorado at Boulder; Publication No. AAT 13863787; ISBN 9781392250754; Source: Masters Abstracts International, vol. 58-06 .; (Year: 2019).*

* cited by examiner

- S41 determining a wave surface slope of the photon in an along-track direction according to the intersection and the sea wave model.

- S42 determining the underwater displacement error according to the wave surface slope and the pointing angle.

METHODS AND DEVICES FOR
CORRECTING UNDERWATER PHOTON
DISPLACEMENT AND FOR DEPTH
SOUNDING WITH SINGLE-PHOTON LIDAR

BACKGROUND OF THE INVENTION

Field of the Invention

The invention relates to the technical field of marine surveying and mapping, and particularly relates to methods and devices for correcting underwater photon displacement and for depth sounding with single-photon Lidar.

Description of Related Art

With the development of marine surveying and mapping technology, Lidar depth sounding technology, as an important branch of Lidar, has also developed rapidly in recent years. It has played an important role in the fields of shallow sea area surveying, river water depth surveying and underwater topography surveying and mapping.

Single-photon Lidar is a new type of laser detection technology developed in recent years. Compared with traditional full-waveform Lidar, the single-photon Lidar has a higher pulse emission repetition frequency, and uses extremely sensitive and highly-sensitive receiving devices to detect the echo envelope amplitude of hundreds or even thousands of photons is converted into the detection of a single photon.

In the prior art, when measuring with the single-photon Lidar, a large number of discrete photons will be acquired, among which noisy photons and photon signals no longer meet the traditional high-signal-noise; therefore, the data processing method based on this measurement technology is also completely different from traditional Lidar. In the process of using the single-photon Lidar to measure underwater terrain and water depth, when a photon passes through the atmosphere and hits the water surface, and penetrates the air-water interface into the water, the water body will produce a refraction effect on photons and the transmission speed of photons is caused to decrease. The effects of these two factors will cause a certain deviation in the underwater terrain and water depth measurement results, and reduce the positioning and measurement accuracy of each photon.

SUMMARY OF THE INVENTION

The present invention aims to solve the technical problems in the related art. To achieve the foregoing objective, a method for correcting underwater photon displacement with a single-photon Lidar is provided in a first embodiment of the present invention. The method includes: acquiring a pointing angle of a photon emitted by the single-photon Lidar, and coordinates of a water-surface photon signal and a water-bottom photon signal returned by the photon emitted by the single-photon Lidar; performing a sea wave fitting according to the water-surface photon signal to determine a sea wave model; determining an intersection of the photon and an air-water interface according to coordinates of any water-bottom photon, the pointing angle and the sea wave model; determining an underwater displacement error of the photon according to the intersection, the sea wave model and the pointing angle; and correcting the coordinates of the water-bottom photon according to the underwater displacement error.

In one embodiment, the step of determining an intersection of the photon and an air-water interface according to coordinates of any water-bottom photon, the pointing angle and the sea wave model includes: constructing a straight line in space according to the coordinates and the pointing angle; and determining an intersection of the straight line in space and the sea wave model as the intersection of the photon and the air-water interface.

In one embodiment, the step of determining an underwater displacement error of the photon according to the intersection, the sea wave model and the pointing angle includes: determining a wave surface slope of the photon in an along-track direction according to the intersection and the sea wave model; and determining the underwater displacement error according to the wave surface slope and the pointing angle.

In one embodiment, the step of determining the underwater displacement error according to the wave surface slope and the pointing angle includes: determining an incident angle and a refraction angle of the photon according to the wave surface slope and the pointing angle; and determining the underwater displacement error according to the refraction angle, the wave surface slope and the pointing angle.

In one embodiment, the step of determining an incident angle and a refraction angle of the photon according to the wave surface slope and the pointing angle includes: determining the incident angle according to the wave surface slope and the pointing angle; and determining the refraction angle according to the incident angle based on Snell's Law.

In one embodiment, the step of determining the underwater displacement error according to the refraction angle, the wave surface slope and the pointing angle includes: determining an original incident photon path and a photon path refracted by water of the photon emitted by the single-photon Lidar; and determining the underwater displacement error according to a spatial structure relationship among the original incident photon path, the photon path refracted by water, the refraction angle, the wave surface slope and the pointing angle.

In one embodiment, the step of determining an original incident photon path and a photon path refracted by water includes: determining the original incident photon path according to coordinates of the water-bottom photon and coordinates of the intersection; and determining the photon path refracted by water according to the original incident photon path based on the refraction formula.

To achieve the above objective, a device for correcting underwater photon displacement with a single-photon Lidar is provided in a second embodiment of the present invention. The device includes: an acquisition module, configured to acquire a pointing angle of a photon emitted by the single-photon Lidar, and coordinates of a water-surface photon signal and a water-bottom photon signal returned by the photon emitted by the single-photon Lidar; a processing module, configured to perform a sea wave fitting according to the water-surface photon signal to determine a sea wave model; further configured to determine an intersection of the photon and an air-water interface according to coordinates of any water-bottom photon, the pointing angle and the sea wave model; further configured to determine an underwater displacement error of the photon according to the intersection, the sea wave model and the pointing angle; and a correction module, configured to correct the coordinates of the water-bottom photon according to the underwater displacement error.

With the method or device for correcting underwater photon displacement with a single-photon Lidar in the invention, high-precision recognition, separation and extraction of water surface and bottom photons are performed through filtering algorithms, and the extracted water-surface photon signals are used to model sea waves. The space coordinates of the water-bottom photon signal and the pointing angle of the photon emission are used to construct a straight line in space, and the intersection of the photon and the air-water interface and the slope of the wave surface at the intersection are calculated. Based on the spatial coordinates of the intersection of the photon and the air-water interface, the wave surface slope and the pointing angle, the point offset and depth error of the underwater photon are determined and corrected through the spatial structure relationship of the water refraction and the underwater photon propagation path. The invention may effectively correct the photon data of two-dimensional and three-dimensional structures, avoiding water refraction problems caused by instantaneous waves and the problem of point position and bathymetry offset errors caused by changes in the photon velocity of the water body, thereby improving the accuracy of data.

To achieve the above objective, a depth sounding method using a single-photon Lidar is provided in a third embodiment of the present invention. The method includes: acquiring coordinates of a water-bottom photon; correcting the coordinates of the water-bottom photon using the abovementioned method for correcting underwater photon displacement with a single-photon Lidar; and determining a depth of a region to be measured according to coordinates of the corrected water-bottom photon signal.

To achieve the above objective, a depth sounding device using a single-photon Lidar is provided in a fourth embodiment of the present invention. The depth sounding device includes: a signal acquisition module, configured to acquire a water-bottom photon; a signal processing module, configured to correct the coordinates of the water-bottom photon using the abovementioned method for correcting underwater photon displacement with a single-photon Lidar; and a depth sounding module, configured to determine a depth of a region to be measured according to coordinates of the corrected water-bottom photon signal.

By using the depth sound method or depth sounding device using a single-photon Lidar in the invention, the coordinates of the acquired underwater photon are corrected based on the above-mentioned method for correcting underwater photon displacement with a single-photon Lidar, such that the accuracy of the coordinates of the underwater photon can be improved, thereby effectively improving the accuracy of depth measurement of the region to be measured.

To achieve the above objective, a non-temporary computer readable storage medium is provided in a fifth embodiment of the present invention, having stored therein a computer program for, when executed by a processor, realizing the abovementioned method for correcting underwater photon displacement with a single-photon Lidar, or the abovementioned depth sounding method using a single-photon Lidar.

To achieve the above objective, a computing device is provided in a sixth embodiment of the present invention. The computing device includes a memory, a processor, and a non-temporary computer readable storage medium stored on the memory and executable on the processor, wherein when executing the program, the processor realizes the abovementioned method for correcting underwater photon displacement with a single-photon Lidar, or the abovementioned depth sounding method using a single-photon Lidar.

The non-temporary computer readable storage medium and the computing device according to the invention have the same beneficial effects as the method for correcting underwater photon displacement with a single-photon Lidar according to the first embodiment of the invention or the depth sounding method using a single-photon Lidar according to the third embodiment of the invention, and will not be repeated here.

DESCRIPTION OF THE PREFERRED EMBODIMENTS

Figure 1:
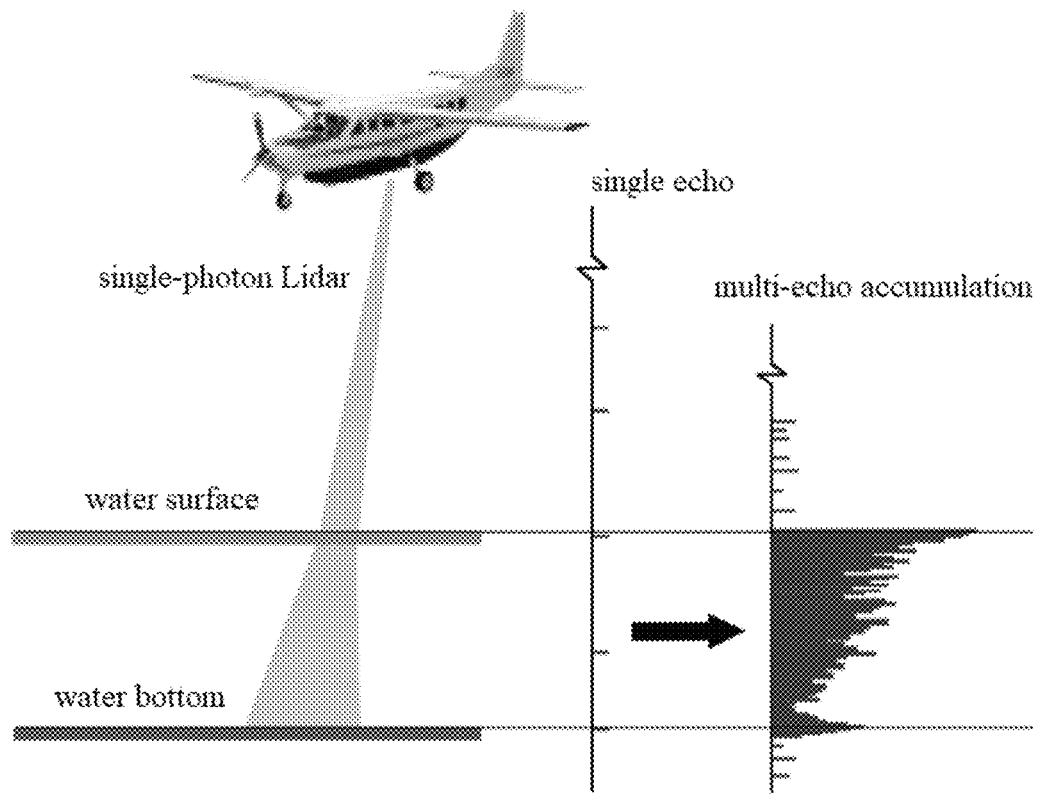
FIG. 1 is a principle diagram of a single-photon Lidar for depth sounding depth.

The embodiments according to the invention will be described in detail below with reference to the accompanying drawings. When the description refers to the accompanying drawings, unless otherwise indicated, the same reference numerals in different drawings represent the same or similar elements. It should be noted that the implementations described in the following exemplary embodiments do not represent all implementations of the invention. They are only examples of devices and methods consistent with some aspects disclosed in the invention as detailed in the claims, and the scope of the invention is not limited thereto. On the premise of no contradiction, the features in the various embodiments of the invention can be combined with each other.

Besides, the terms '1st', '2nd' are used only for description and shall not be interpreted as an indication or implication of relative importance or an implicit indication of the number of technical features. Thus, features defined with "first", "second" may include at least one such feature, either explicitly or implicitly. In the description of the present disclosure, the meaning of "a plurality" is at least two, such as two, three, etc., unless specifically defined otherwise.

Lidar, as an active remote sensing technology that can quickly, efficiently and accurately obtains three-dimensional terrain data, has been widely recognized in the industry. However, in the fields such as high-sensitivity and long-distance detection, ocean and atmosphere detection, and intertidal water depth detection, the Lidar based on traditional linear detection system is limited by low target reflectivity or low system laser energy and detector sensitivity, the strength of the echo signal received by the receiver is extremely weak, and the signal-to-noise ratio may not meet the system requirements, so that the further development and application of Lidar is limited. The single-photon Lidar based on the photon counting detection system has the characteristics of low laser pulse energy, high laser repetition frequency output, and extremely high detection sensitivity, thereby becoming a research hotspot of new laser ranging technology. Our country has a long coastline, and the development of laser depth sounding technology research is of great significance to fill my country's offshore resource mapping.

The single-photon Lidar is quite different from the traditional full-wave Lidar in the design idea and data processing method. When acquiring effective signals, it no longer focuses on acquiring high signal-to-noise ratio waveforms with high-energy emission, but instead focuses on using limited resources and making full use of every photon in the echo signal. Moreover, by improving the method of data processing, effective signal extraction may also be achieved in low signal-to-noise ratio signals. Laser depth sounding technology based on single-photon detection has become the future development trend and direction. During the process of using the single-photon Lidar to measure underwater terrain and water depth, when a photon passes through the atmosphere and hits the water surface, and penetrates the air-water interface, the water body will produce a refraction effect on photons and the transmission speed of photons is caused to decrease. The effects of these two factors will cause a certain deviation in the underwater terrain and water depth measurement results, and reduce the positioning and measurement accuracy of each photon. Therefore, effective correction is one of the important links to ensure and improve the accuracy and precision of underwater terrain and water depth measurement.

In the invention, high-precision recognition, separation and extraction of water surface and bottom photons are performed through filtering algorithms. The extracted water-surface photon signals are used to model sea waves. The space coordinates of the water-bottom photon signal and the pointing angle of the photon emission are used to construct a space straight line, and the coordinates of the spatial intersection of the photon and the ocean wave as well as the wave surface slope and normal vector at the intersection are calculated and acquired. At last, based on the spatial coordinates of the intersection of the photon and the air-water interface, the wave surface slope and the normal vector as well as the spatial coordinates of the water-bottom photon, the point position and depth sounding error of the underwater photon are corrected through the spatial structure relationship of the water refraction and the underwater photon propagation path. The invention may effectively correct the photon data of two-dimensional and three-dimensional structures, avoiding water refraction problems caused by instantaneous waves and the problem of point position and bathymetry offset errors caused by changes in the photon velocity of the water body.

FIG. 1 is a principle diagram of a single-photon Lidar for depth sounding depth. The single-photon Lidar emits laser light to the water body, producing multiple backscattering and diffuse reflections in the atmosphere, air-water interface, water body, and water bottom respectively, and these scattered and reflected signals return to the detector through the opposite path again. Due to the greater attenuation of the laser light by water bodies, the echo signals from the water surface and land are strong and the echo signals from the bottom are weak. The single-photon detector may respond to these strong or weak photon signals and output digital pulses. The time measurement circuit may measure a time interval between these pulses and the main laser wave to obtain distance information corresponding to the photon event. Factors such as the backscattering of air and water body, sunlight and the dark count and dead time of the detector itself will affect the recognition of the target. However, the single-photon Lidar detection system is based on the accumulation of all photon events, and it then extracts the water surface and bottom information according to probability statistics and distance-related algorithms after obtaining the histogram shown on the right in FIG. 1, so as to realize the measurement of water depth under low signal-to-noise ratio conditions. Thus, the data processing method based on the measurement technology using single-photon Lidar is completely different from traditional Lidar.

Figure 2:
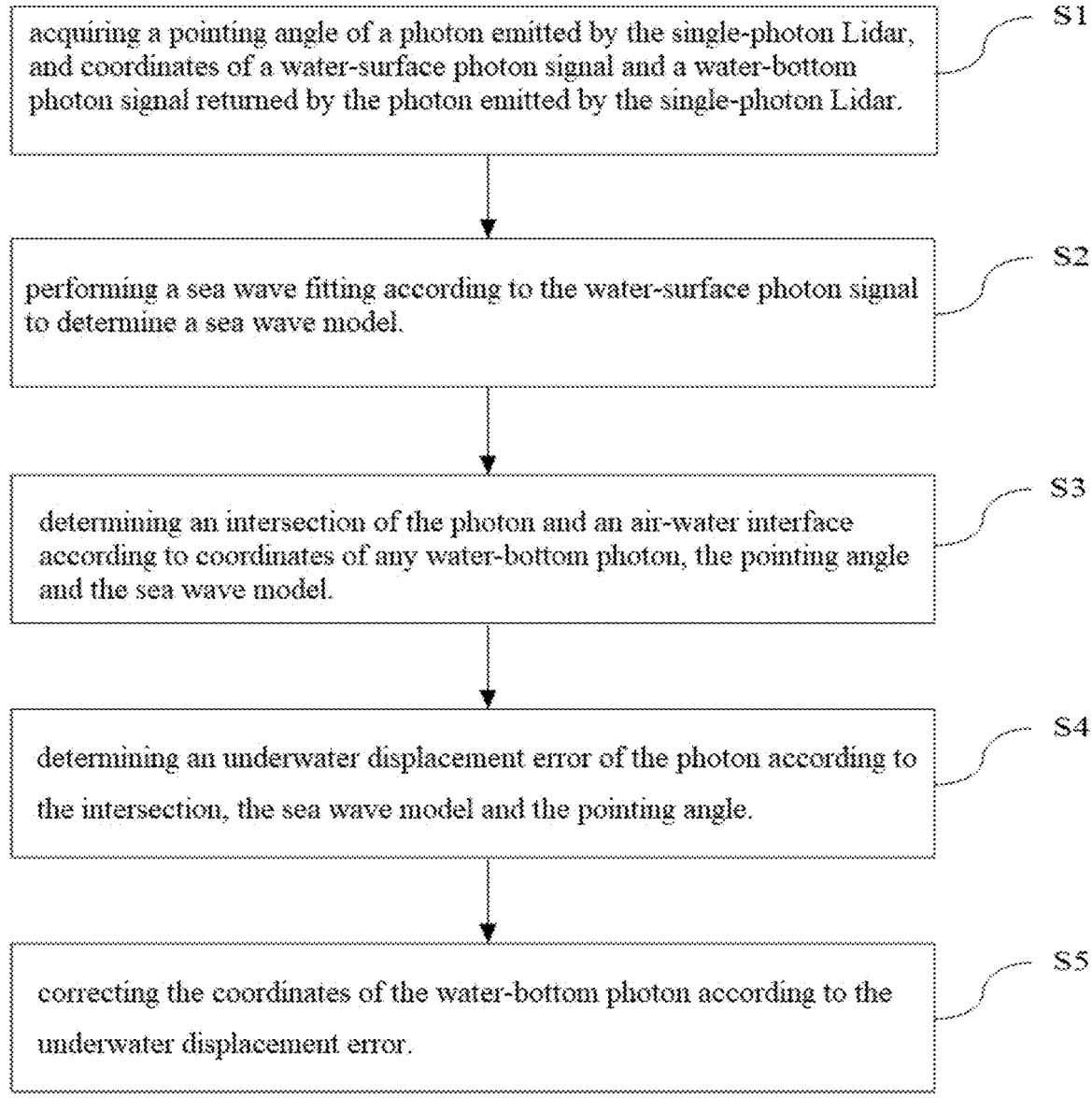
FIG. 2 is a flow chart of a method for correcting underwater photon displacement with a single-photon Lidar according to an embodiment of the invention.

FIG. 2 is a flow chart of a method for correcting underwater photon displacement with a single-photon Lidar according to an embodiment of the invention, which includes steps S1 to S5.

Figure 3:
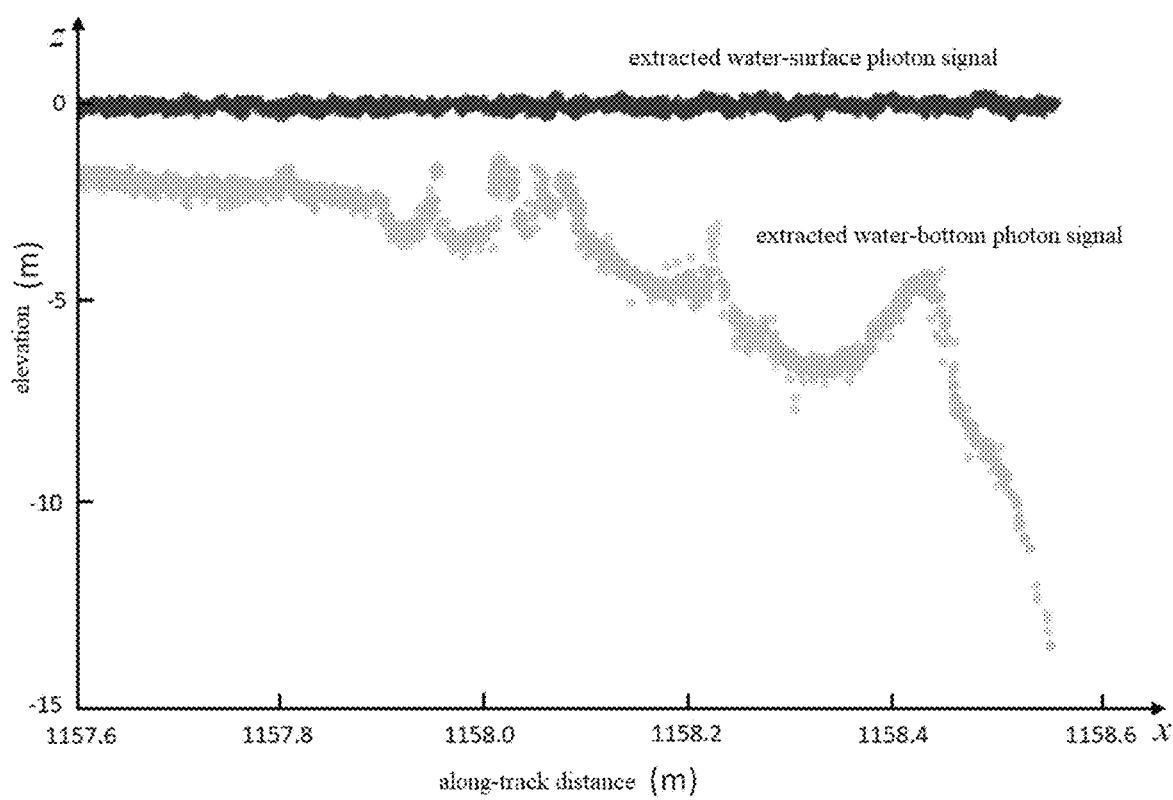
FIG. 3 is a diagram of the obtained water surface photon signal and the water bottom photon signal according to an embodiment of the invention.

In the step S1, a pointing angle of a photon emitted by the single-photon Lidar, and coordinates of a water-surface photon signal and a water-bottom photon signal returned by the photon emitted by the single-photon Lidar are acquired. FIG. 3 is a diagram of a water-surface photon signal and a water-bottom photon signal acquired according to an embodiment of the invention. In one embodiment of the invention, a photon signal returned by a single-photon-Lidar-emitted laser signal is acquired, and the effective photon signal may be identified and separated from the noise photon through various filtering and related algorithms, so as to acquire a series of effective photon signals, and extract the water-surface photon signal and the water-bottom photon signal among them. In one embodiment of the invention, the pointing angle of the photon and the coordinates of the underwater photon signal may be obtained from the data obtained and recorded by the single-photon Lidar.

In the step S2, a sea wave fitting is performed according to the water-surface photon signal to determine a sea wave model. In one embodiment of the invention, the sea wave fitting is performed according to the extracted large number of water-surface photon signals. During the process of fitting, piecewise polynomials and wave geometric models may be used. The two-dimensional model of the piecewise polynomial and the sea wave geometric model are expressed as formulas (1) and (2), and the corresponding three-dimensional models are expressed as formulas (3) and (4), wherein $a_i$, $b_i$, $c_i$, $d_i$, $e_i$, $f_i$, $g_i$, $h_i$, $k_i$, $l_i$ respectively represent the polynomial coefficients, and $A_i$, $\omega_i$, $\phi_i$, $\varphi_i$, g respectively represent the amplitude, angular velocity, direction angle, initial phase and gravitational acceleration of each waveform in the wave geometry model, and $H_0$ represents a constant offset caused when the sea level in the WGS84 geographic coordinate system is a negative value. In one embodiment of the invention, during the process of fitting, the LM (Levenberg-Marqyardt) algorithm based on the least square method may be used to optimize the instantaneous wave parameters to obtain an accurate sea wave model.

$$z = \sum_{i=1}^{n} a_i x^3 + b_i x^2 + c_i x + d_i \tag{1}$$

$$z = \sum_{i=1}^{n} A_i \cos\left(\frac{\omega_i^2}{g} \cdot x + \varphi_i\right) + H_0 \tag{2}$$

$$z = \sum_{i=1}^{n} a_i x^3 + b_i y^3 + c_i x^2 y + d_i x y^2 + e_i x^2 + f_i y^2 + g_i x y + h_i x + k_i y + l_i \tag{3}$$

$$z = \sum_{i=1}^{n} A_i \cos\left[\frac{\omega_i^2}{g}(x \cdot \cos\phi_i + y \cdot \sin\phi_i) + \varphi_i\right] + H_0 \tag{4}$$

Figure 4:
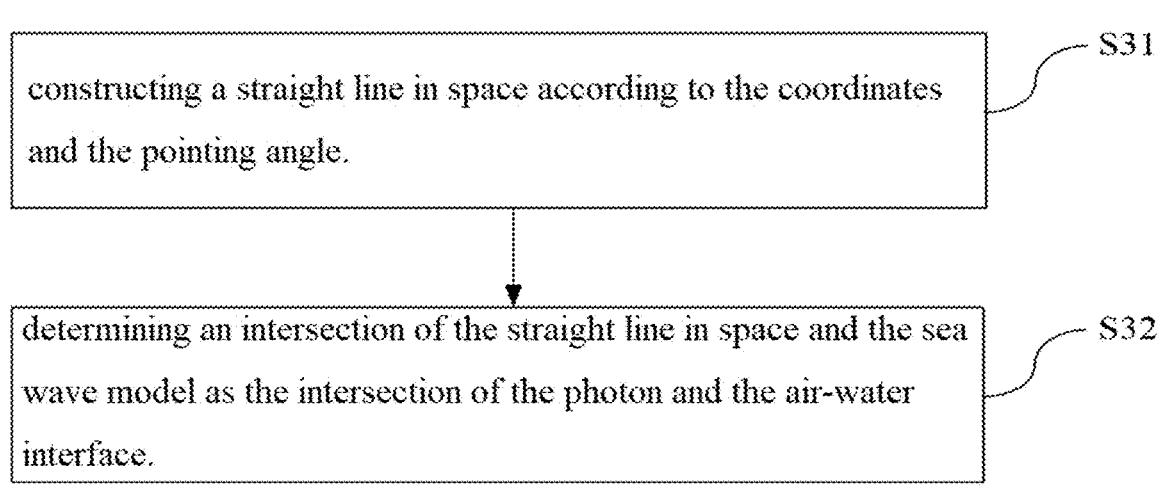
FIG. 4 is a flow chart of a step for determining the intersection of the photon and the water-air interface according to an embodiment of the invention.

In the step S3, an intersection of the photon and an air-water interface is determined according to coordinates of any water-bottom photon, the pointing angle and the sea wave model. FIG. 4 is a flow chart of determining an intersection of the photon and an air-water interface according to an embodiment of the invention, which includes steps S31 to S32.

Figures 5, 6:
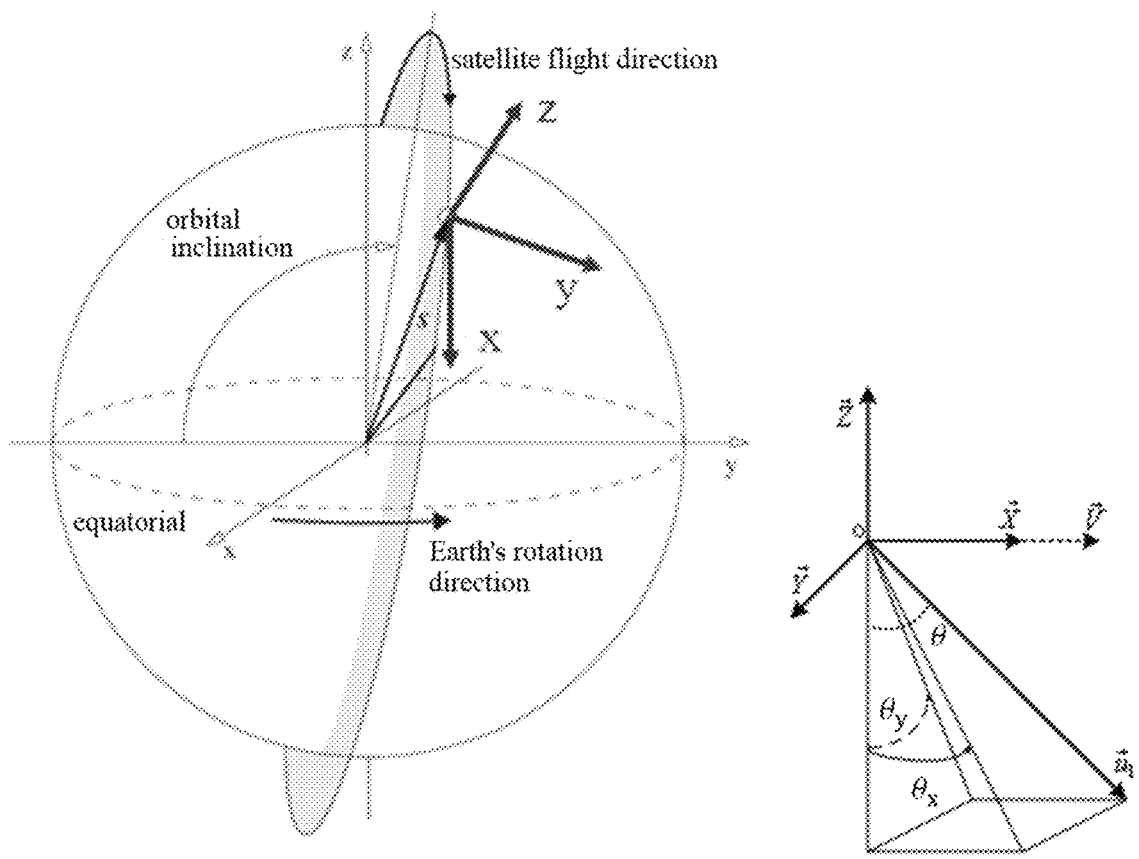
FIG. 5 is a spatial diagram of photon coordinates and the pointing angle according to an embodiment of the invention.
FIG. 6 is a flow chart of a step for determining underwater photon displacement according to an embodiment of the invention.

In the step S31, a straight line in space is constructed according to the coordinates and the pointing angle. FIG. 5 shows a spatial diagram of photon coordinates and pointing angles according to an embodiment of the invention. In one embodiment of the invention, based on the measurement principle and characteristics of single-photon Lidar itself, the three-dimensional coordinates of each photon may be obtained. By projecting the satellite-borne three-dimensional data onto the two-dimensional plane along the orbital direction and the vertical orbit direction of the satellite, so that the three-dimensional coordinates (x, y, z) may be converted into two-dimensional coordinates (x, z) and (y, z), for example, coordinates of the water-bottom photon q is $(x_q, z_q)$ wherein x represents the direction in which the satellite flies along the orbit, z represents the vertical elevation direction, and y is the vertical orbit direction. $\theta_x$ and $\theta_y$ are the corresponding two components of the photon emission pointing angle $\theta$ in the x and y directions. Taking a plane ∠zox as an example in the embodiment of the present invention, according to the coordinate $(x_q, z_q)$ and the pointing angle $\theta_x$ of the water-bottom photon, a straight line in space may be constructed as shown in formula (5):

$$z = k_1 \cdot x + k_2, \left(k_1 = -\frac{1}{\tan\theta_x}, k_2 = z_q + \frac{x_q}{\tan\theta_x}\right) \tag{5}$$

wherein $k_1$ and $k_2$ represent the straight line parameters obtained by calculation of the coordinates and the pointing angle $\theta_x$ of the water-bottom photon.

In the step S32, an intersection of the straight line in space and the sea wave model is determined as the intersection of the photon and the air-water interface. In one embodiment of the invention, after constructing the above spatial straight line, which intersects with the sea wave model, the intersection is determined as the intersection p between the photon and the air-water interface. According to the above-constructed spatial straight line formula (5) combined with the sea wave model (take piecewise polynomial as an example) formula (1), the coordinates $(x_p, z_p)$ of the intersection p may be calculated.

In the step S4, an underwater displacement error of the photon is determined according to the intersection, the sea wave model and the pointing angle. FIG. 6 is a flow chart of determining an underwater displacement of the photon according to an embodiment of the invention, which includes steps S41 to S42.

In the step S41, a wave surface slope of the photon in an along-track direction is determined according to the intersection and the sea wave model. In one embodiment of the invention, according to the above-determined intersection p and the sea model, the wave surface slope $\tan\vartheta_p$ of the photon in the along-track direction x may be calculated, as shown by the following formula (6):

$$\tan\vartheta_p = 3a_i x_p^2 + 2b_i x_p + c_i (i=1, \ldots, n) \tag{6}$$

wherein $a_i$, $b_i$, $c_i$ respectively represent the polynomial coefficients of the aforementioned sea wave model. In one embodiment of the invention, the formula (6) is determined by obtaining the first derivative of the formula (1).

Figure 7:
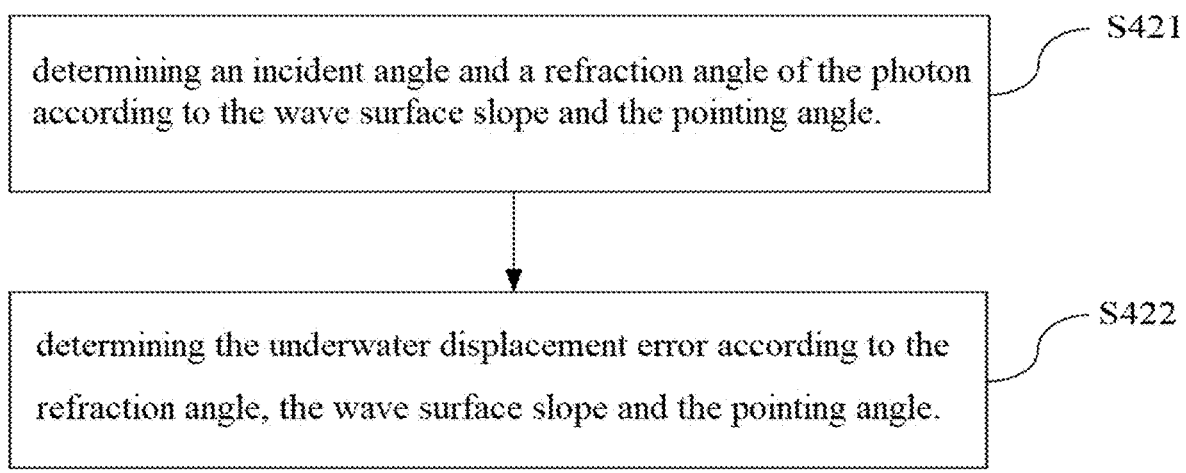
FIG. 7 is a flow chart of a step for determining underwater displacement error based on the wave surface slope and the pointing angle according to an embodiment of the invention.

In the step S42, the underwater displacement error is determined according to the wave surface slope $\tan\vartheta_p$ and the pointing angle $\theta_x$. FIG. 7 is a flow chart of determining an underwater displacement error according to the wave surface slope and the pointing angle according to an embodiment of the invention, which includes steps S421 to S422.

Figure 8:
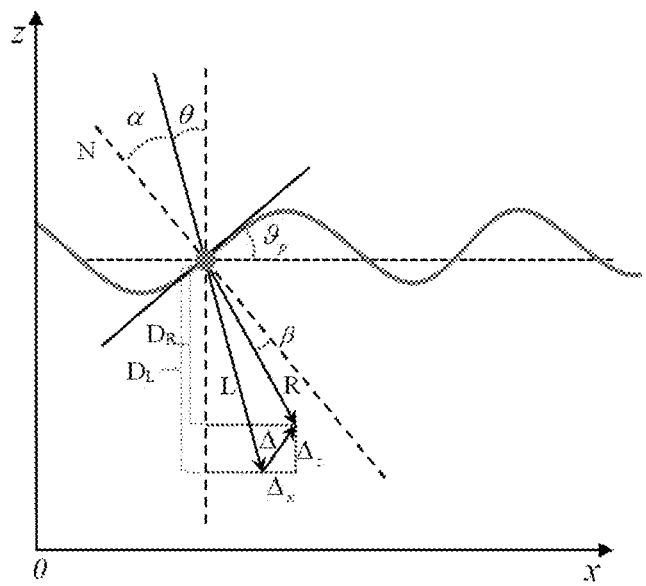
FIG. 8 is a first spatial structural diagram for determining a displacement error according to an embodiment of the invention.
Figure 9:
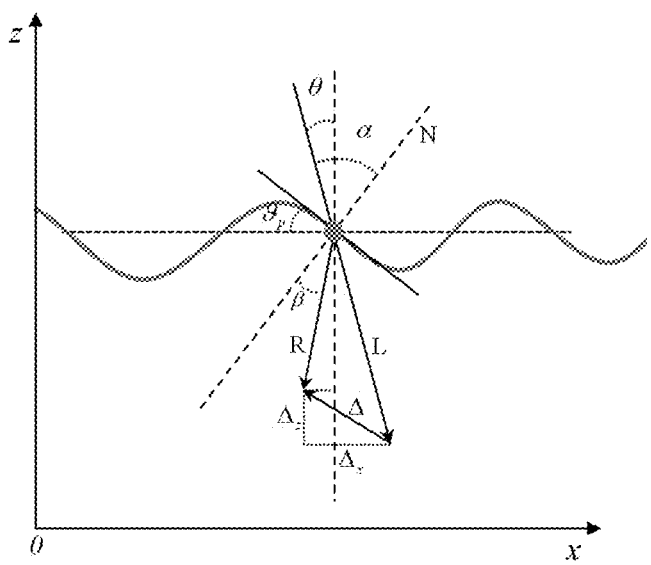
FIG. 9 is a second spatial structural diagram for determining a displacement error according to an embodiment of the invention.

In the step S421, an incident angle and a refraction angle of the photon are determined according to the wave surface slope and the pointing angle. In one embodiment of the invention, based on the spatial structure, the incident angle α of the photon may be obtained, and then the refraction angle β may be obtained according to Snell's law. In one embodiment of the invention, based on the difference in the spatial position of the intersection p of the wave and the air-water interface, and the relationship between the wave surface slope $\tan\vartheta_p$ and the pointing angle $\theta_x$, it is divided into two cases, one is the case of $0 \leq \vartheta_p \leq \theta_x$, and the other is the case of $\theta_x < \vartheta_p \leq 180°$. FIG. 8 is a spatial structural diagram one of determining displacement error according to an embodiment of the invention, and FIG. 9 is a spatial structural diagram two of determining displacement error according to an embodiment of the invention, wherein FIG. 8 shows a case where the wave surface slope is $0 \leq \vartheta_p \leq \theta_x$, and FIG. 9 shows a case where the wave surface slope is $\theta_x < \vartheta_p \leq 180°$.

In one embodiment of the invention, according to the wave surface slope $\tan\vartheta_p$, the normal vector N of the intersection p of the photon and the air-water interface may be determined, as shown by the following formula (7):

$$N = \frac{-\tan\vartheta_p}{\sqrt{1+\tan^2\vartheta_p}} \tag{7}$$

According to the spatial structure relationship, the incident angle α may be determined according to formulas (8) and (9):

$$\alpha = \theta_x - \vartheta_p, \quad (0 \leq \vartheta_p \leq \theta_x) \tag{8}$$

$$\alpha = \vartheta_p - \theta_x, \quad (\theta_x \leq \vartheta_p \leq 180°) \tag{9}$$

wherein $\vartheta_p$ represents the wave surface slope angle. In one embodiment of the invention, after the incident angle α of the photon may be obtained based on the spatial structure, the refraction angle β may be obtained according to Snell's law, as shown by the following formulas (10) and (11), respectively:

$$\beta = \sin^{-1}\left(\frac{\sin\alpha}{n_w}\right) = \sin^{-1}\left[\frac{\sin(\theta_x - \vartheta_p)}{n_w}\right] \tag{10}$$

$$\beta = \sin^{-1}\left(\frac{\sin\alpha}{n_w}\right) = \sin^{-1}\left[\frac{\sin(\vartheta_p - \theta_x)}{n_w}\right] \tag{11}$$

wherein $$n_w = \frac{\sin\alpha}{\sin\beta}$$

represents the refractive index of water body. In one embodiment of the invention, since the overall transmission time of a photon in the atmosphere and water may not be separated in the measurement process of the single-photon Lidar while the transmission time of photons in water being constant, i.e., the transmission time may not change due to water refraction and speed changes, the refractive index $n_w$ of water body may be determined based on Snell's law according to the following formula (12):

$$n_w = \frac{C_a \cdot t/2}{C_w \cdot t/2} \tag{12}$$

wherein $C_a$ and $C_w$ are the transmission speed of photons in air and water, respectively, and t represents the transmission time of photons in water.

Figure 10:
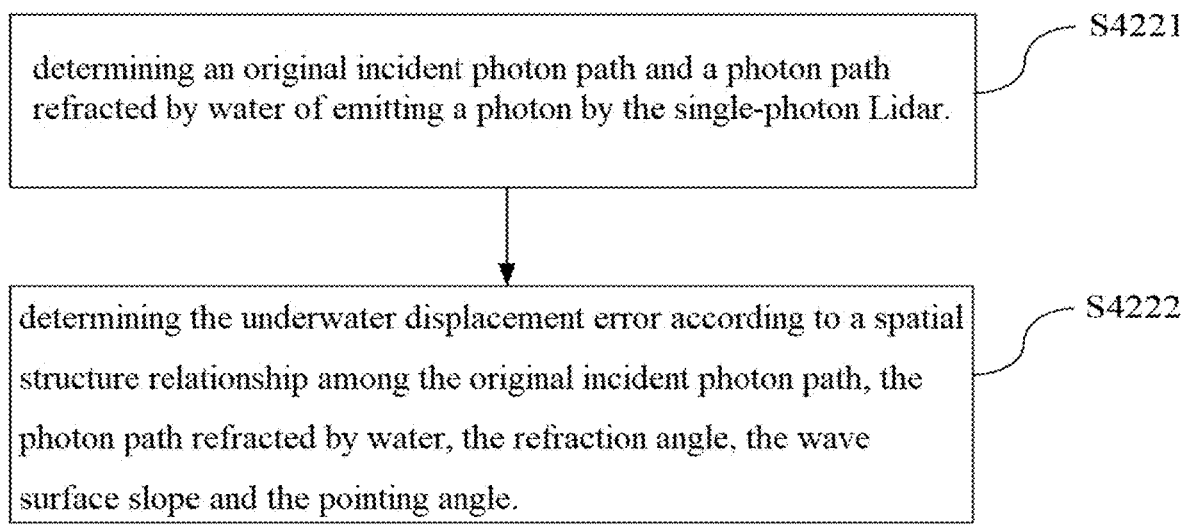
FIG. 10 is a flow chart of a step for determining an underwater displacement error based on the refraction angle, the wave surface slope, and the pointing angle according to an embodiment of the invention.

In the step S422, the underwater displacement error is determined according to the refraction angle, the wave surface slope and the pointing angle. FIG. 10 is a flow chart of determining an underwater displacement error according to the refraction angle, the wave surface slope and the pointing angle according to an embodiment of the invention, which includes steps S4221 to S4222.

In the step S4221, an original incident photon path and a photon path refracted by water of emitting a photon by the single-photon Lidar are determined. In one embodiment of the invention, the original incident photon path is determined according to the coordinates of the water-bottom photon and the coordinates of the intersection, and then the photon path refracted by water is determined according to the original incident photon path based on the refraction formula.

In one embodiment of the invention, according to the coordinates $(x_q, z_q)$ of the water-bottom photon determined above and the coordinates $(x_p, z_p)$ of the intersection p, the component $L_x$ of the original incident photon path L on the plane ∠zox and the component $R_x$ of photon path R after refraction of the water body on the plane ∠zox may be respectively calculated by a distance formula (as shown in FIG. 8 and FIG. 9). Since the photon path refracted by the water body and the original incident photon path satisfy the refraction formula, the photon path R refracted by water body may be determined according to the original incident photon path L and the water refractive $$n_w = \frac{L}{R} = \frac{L_x}{R_x} \tag{13}$$

index $n_w$, as shown by the following formula (13):

In the step S4222, the underwater displacement error is determined according to a spatial structure relationship among the original incident photon path, the photon path refracted by water, the refraction angle, the wave surface slope and the pointing angle. In one embodiment of the invention, in the case that $0 \leq \vartheta_p \leq \theta_x$, as shown in FIG. 8, according to the relationship between the photon path $L_x$ of the original incident photon and the photon $$\begin{cases} \Delta_x = R_x \cdot \sin(\vartheta_p + \beta) - L_x \cdot \sin\theta_x = L_x \cdot \left[\sin(\vartheta_p + \beta) \cdot \frac{1}{n_w} - \sin\theta_x\right] \\ \Delta_z = L_x \cdot \cos\theta_x - R_x \cdot \cos(\vartheta_p - \beta) = L_x \cdot \left[\cos\theta_x - \cos(\vartheta_p - \beta) \cdot \frac{1}{n_w}\right] \end{cases} \tag{14}$$

path $R_x$ after refraction of the water body, a displacement error model of the photon in different directions is constructed to determine the displacement error $\Delta_x$ and $\Delta_z$ of the photon in different directions, as shown by the following formula (14):

wherein $\Delta_x$ represents the position offset error in the along-track direction, and $\Delta_z$ represents the water depth error in the elevation z direction, that is, the difference between the photon q before water depth correction $D_L$ and the photon q after water depth correction $D_R$.

In one embodiment of the invention, in the case that $\theta_x < \vartheta_p \leq 180°$, as shown in FIG. 9, since the direction of the normal vector N of the intersection p of the photon and the air-water interface is different from that of the case that $0 \leq \vartheta_p \leq \theta_x$, the incident angle α of the photon should be obtained again based on the spatial structure according to formula (9), then the refraction angle β should be obtained according to formula (11), and finally a displacement error model of the photon in different directions is constructed according to the relationship between the photon path $L_x$ of the original incident photon and the photon path $R_x$ after refraction of the water body to determine the displacement error $\Delta_x$ and $\Delta_z$ of the photon in different directions. In this embodiment of the present invention, in the case that $\theta_x < \vartheta_p \leq 180°$, there are two situations existed, namely $\theta_x < \vartheta_p \leq 90° + \theta_x$ and $90° + \theta_x < \vartheta_p \leq 180°$, thus the underwater displacement errors $\Delta_x$ and $\Delta_z$ of the photon in different directions are calculated as shown by the following formula (15):

$$\begin{cases} \Delta_x = R_x \cdot \sin(\vartheta_p - \beta) - L_x \cdot \sin\theta_x = L_x \cdot \left[ \sin(\vartheta_p - \beta) \cdot \dfrac{1}{n_w} - \sin\theta_x \right], \\ \qquad\qquad (\theta_x < \vartheta_p \le 90° + \theta_x) \\ \Delta_x = R_x \cdot \sin(\vartheta_p + \beta - 180°) - L_x \cdot \sin\theta_x = L_x \cdot \left[ \sin(\vartheta_p + \beta - 180°) \cdot \dfrac{1}{n_w} - \sin\theta_x \right], \\ \qquad\qquad (90° + \theta_x < \vartheta_p \le 180°) \\ \Delta_z = L_x \cdot \cos\theta_x - R_x \cdot \cos(\vartheta_p - \beta) = L_x \cdot \left[ \cos\theta_x - \cos(\vartheta_p - \beta) \cdot \dfrac{1}{n_w} \right] \end{cases} \quad (15)$$

In one embodiment of the invention, when the single-photon Lidar (photon counting radar) performs water depth measurement, laser photons are refracted at the air-water interface, and the propagation speed of photons in the water body changes, resulting in errors in underwater topographic measurement. Different from traditional full-waveform Lidar, the single-photon Lidar is a new type of measurement technology and method based on Poisson distribution theory in the form of photon event statistics. This method has higher measurement accuracy than traditional Lidar. However, the single-photon Lidar may not obtain the coordinate value of the intersection of photon and air-water interface like traditional Lidar; therefore, the method for correcting photon refraction and velocity change is significantly different from traditional radar.

It can be understood that the method of the embodiment of the invention is also applicable to a three-dimensional space. In the three-dimensional space structure, the displacement and depth errors of the photon are determined as shown in the following formula (16):

$$\begin{cases} \Delta_x = L_x \cdot \left[ \sin(\vartheta_p^x + \beta_x) \cdot \dfrac{1}{n_w} - \sin\theta_x \right], \; \left(0 \le \vartheta_p^x \le \theta_x\right) \\ \Delta_x = L_x \cdot \left[ \sin(\vartheta_p^x - \beta_x) \cdot \dfrac{1}{n_w} - \sin\theta_x \right], \; \left(\theta_x \le \vartheta_p^x \le 90° + \theta_x\right) \\ \Delta_x = L_x \cdot \left[ \sin(\vartheta_p^x + \beta_x - 180°) \cdot \dfrac{1}{n_w} - \sin\theta_x \right], \; \left(90° + \theta_x \le \vartheta_p^x \le 180°\right) \\ \Delta_y = L_y \cdot \left[ \sin(\vartheta_p^y + \beta_y) \cdot \dfrac{1}{n_w} - \sin\theta_y \right], \; \left(0 \le \vartheta_p^y \le \theta_y\right) \\ \Delta_y = L_y \cdot \left[ \sin(\vartheta_p^y - \beta_y) \cdot \dfrac{1}{n_w} - \sin\theta_y \right], \; \left(\theta_y \le \vartheta_p^y \le 90° + \theta_y\right) \\ \Delta_y = L_y \cdot \left[ \sin(\vartheta_p^y + \beta_y - 180°) \cdot \dfrac{1}{n_w} - \sin\theta_y \right], \; \left(90° + \theta_y \le \vartheta_p^y \le 180°\right) \\ \Delta_z = \dfrac{L_x \cdot \left[\cos\theta_x - \cos(\vartheta_y^x - \beta_x) \cdot \dfrac{1}{n_w}\right] + L_y \cdot \left[\cos\theta_y - \cos(\vartheta_y^y - \beta_y) \cdot \dfrac{1}{n_w}\right]}{2} \end{cases} \quad (16)$$

wherein $(\theta_x, \theta_y)$, $(\vartheta_p^x, \vartheta_p^y)$, $(\beta_x, \beta_y)$ represent the projection components of the pointing angle of the photon, the wave surface slope angle, and the refraction angle on the planes $\angle zox$ and $\angle zoy$.

In the step S5, the water-bottom photon signal is corrected according to the underwater displacement error. In one embodiment of the invention, $\Delta_x$ and $\Delta_z$ are added to the coordinates of the water-bottom photon to complete the correction of the water-bottom photon signal due to the displacement error caused by the water refraction and the photon velocity change.

It can be understood that the method of the embodiment of the invention is applicable to satellite platforms and also to airborne platforms.

Figure 11:
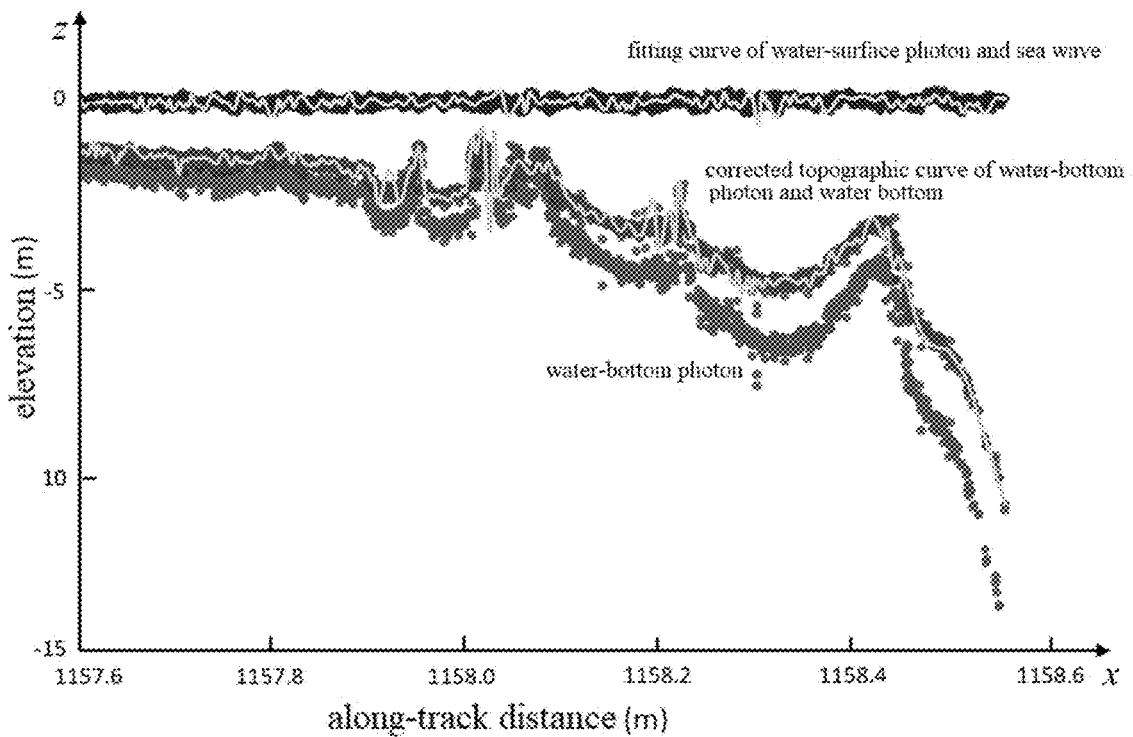
FIG. 11 is a diagram showing correction results according to an embodiment of the invention.

FIG. 11 is a diagram showing correction results according to an embodiment of the invention. As shown in FIG. 11, the horizontal curve in the 0-scale region on the z-axis represents the extracted effective photon signal on the water surface and the wave curve fitted by these photons (since the data length is about 2 kilometers, the curve looks tortuous due to the display scale problem. In fact, after zooming in the part, the wave curve is relatively smooth), and the region where there is no fitting curve under water is the extracted original underwater topographic photon signal. The photons in the region covered by the underwater fitting curve are all underwater topographic photons corrected by the method of the embodiment of the invention, and the corresponding curve is the underwater topographic curve fitted with the corrected photons. After being corrected by the correction method of the embodiment of the invention, the coordinate position of each original photon is corrected and compensated to make the position representation more accurate.

With the method for correcting underwater photon displacement with a single-photon Lidar in the embodiment of the invention, high-precision recognition, separation and extraction of water surface and bottom photons are performed through filtering algorithms, and the extracted water-surface photon signals are used to model sea waves. The space coordinates of the water-bottom photon signal and the pointing angle of the photon emission are used to construct a space straight line, and the intersection coordinates of the photon and the air-water interface and the slope of the wave surface at the intersection are calculated. At last, based on the spatial coordinates of the intersection of the photon and the air-water interface, the wave surface slope, the spatial coordinates and the pointing angle, the point offset and depth error of the underwater photon are determined and corrected through the spatial structure relationship of the water refraction and the underwater photon propagation path. The invention may effectively correct the photon data of two-dimensional and three-dimensional structures, avoiding water refraction problems caused by instantaneous waves and the problem of point position and bathymetry offset errors caused by changes in the photon velocity of the water body, thereby improving the accuracy of data.

Figure 12:
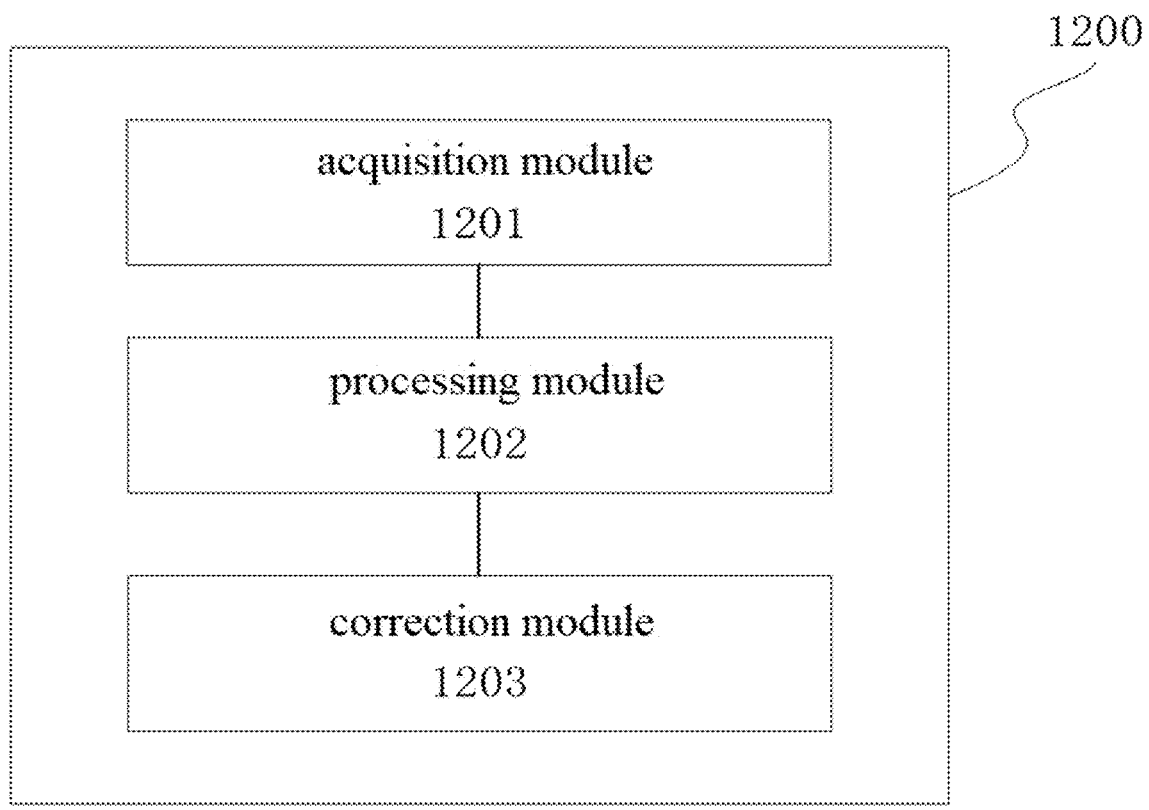
FIG. 12 is a structural diagram of a device for correcting underwater photon displacement with a single-photon Lidar according to an embodiment of the invention.

A device for correcting underwater photon displacement with a single-photon Lidar is provided in a second embodiment of the present invention. FIG. 12 is a structural diagram of a device 1200 for correcting underwater photon displacement with a single-photon Lidar according to an embodiment of the invention, which includes an acquisition module 1201, a processing module 1202 and a correction module 1203.

The acquisition module 1201 is configured to acquire a pointing angle of a photon emitted by the single-photon Lidar, and coordinates of a water-surface photon signal and a water-bottom photon signal returned by the photon emitted by the single-photon Lidar.

The processing module 1202 is configured to perform a sea wave fitting according to the water-surface photon signal to determine a sea wave model; further configured to determine an intersection of the photon and an air-water interface according to coordinates of any water-bottom photon, the pointing angle and the sea wave model; further configured to determine an underwater displacement error of the photon according to the intersection, the sea wave model and the pointing angle.

The correction module 1203 is configured to correct the coordinates of the water-bottom photon according to the underwater displacement error.

In one embodiment of the invention, the processing module 1202 is further configured to construct a straight line in space according to the coordinates and the pointing angle; to determine an intersection of the straight line in space and the sea wave model as the intersection of the photon and the air-water interface.

In one embodiment of the invention, the processing module 1202 is further configured to determine a wave surface slope of the photon in an along-track direction according to the intersection and the sea wave model; further to determine the underwater displacement error according to the wave surface slope and the pointing angle.

For more specific embodiments of each module of the device 1200 for correcting underwater photon displacement with a single-photon Lidar, please refer to the description of the method for correcting underwater photon displacement with a single-photon Lidar of the invention. The two have similar beneficial effects, and the former one will not be repeated here.

Figure 13:
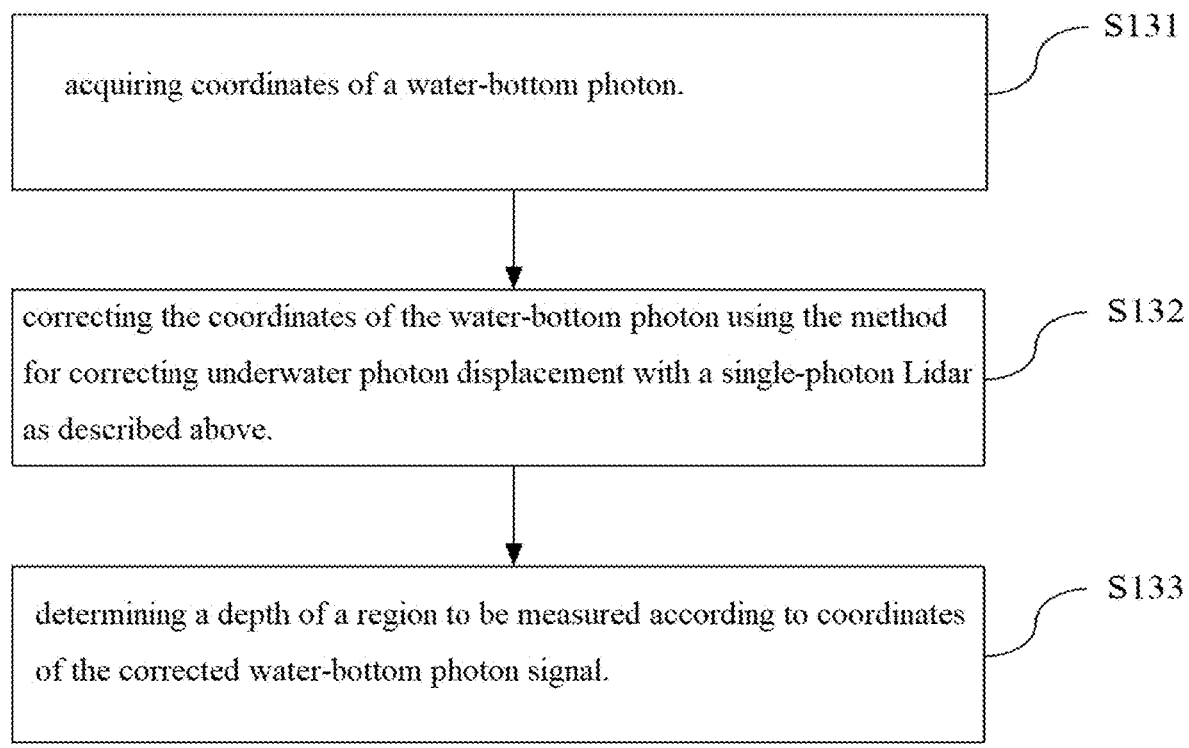
FIG. 13 is a flow chart of a depth sounding method using a single-photon Lidar according to an embodiment of the invention.

A depth sounding method using a single-photon Lidar is provided in a third embodiment of the present invention. FIG. 13 is a flow chart of a depth sounding method using a single-photon Lidar according to an embodiment of the invention, which includes steps S131 to S133.

In the step S131, coordinates of a water-bottom photon is acquired.

In the step S132, the coordinates of the water-bottom photon is corrected using the method for correcting underwater photon displacement with a single-photon Lidar as described above.

In the step S133, a depth of a region to be measured is determined according to coordinates of the corrected water-bottom photon signal. It is to be understood that in the embodiment of the invention, an existing algorithm may be used to process the coordinates of the corrected underwater photon signal to determine the depth of the region to be measured.

With depth sounding method using a single-photon Lidar of the embodiment of the invention, through correction of the acquired coordinates of the underwater photon based on the abovementioned method for correcting underwater photon displacement with a single-photon Lidar, the accuracy of the coordinates of the water-bottom photon may be improved, so as to effectively improve the accuracy of depth measurement of the region to be measured.

Figure 14:
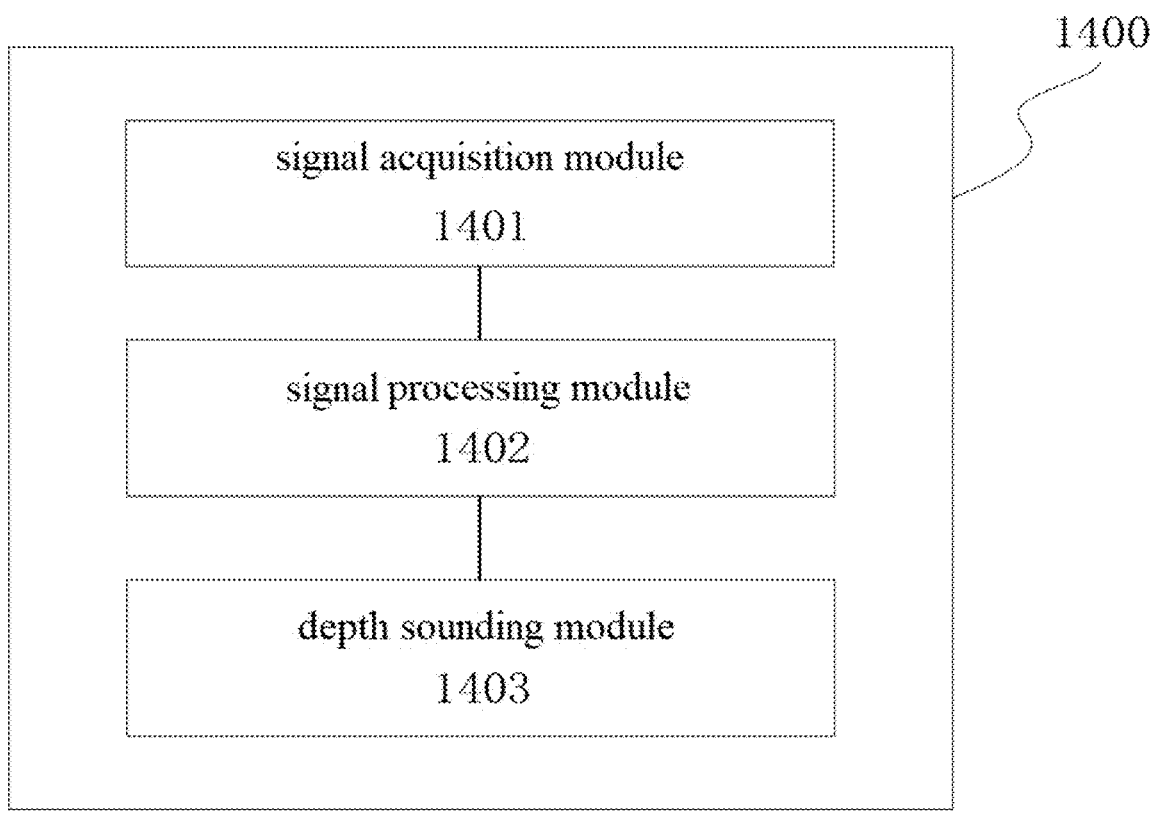
FIG. 14 is a structural diagram of a depth sounding device using a single-photon Lidar according to an embodiment of the invention.

A depth sounding device using a single-photon Lidar is provided in a fourth embodiment of the present invention. FIG. 14 is a structural diagram of a depth sounding device 1400 using a single-photon Lidar according to an embodiment of the invention, which includes a signal acquisition module 1401, a signal processing module 1402 and a depth sounding module 1403.

The signal acquisition module 1401 is configured to acquire a water-bottom photon.

The signal processing module 1402 is configured to correct the coordinates of the water-bottom photon using the method for correcting underwater photon displacement with a single-photon Lidar as described above.

The depth sounding module 1403 is configured to determine a depth of a region to be measured according to coordinates of the corrected water-bottom photon signal.

For more specific embodiments of each module of the depth sounding device 1400 using a single-photon Lidar, please refer to the description of the depth sounding method using a single-photon Lidar of the invention. The two have similar beneficial effects, and the former one will not be repeated here.

A non-temporary computer readable storage medium is provided in a fifth embodiment of the present invention, which having stored therein a computer program for, when executed by a processor, realizing the method for correcting underwater photon displacement with a single-photon Lidar according the first aspect of the invention, or the depth sounding method using a single-photon Lidar according to the third aspect of the invention.

Generally speaking, the computer instructions used to implement the method of the invention may be carried by any combination of one or more computer-readable storage medium. A non-transitory computer-readable storage medium may include any computer-readable medium except for the temporarily propagating signal itself.

The computer-readable storage medium may be, for example, but not limited to, an electrical, magnetic, optical, electromagnetic, infrared, or semiconductor system, device, or device, or any combination of the above. More specific examples (non-exhaustively listed) of the computer readable storage medium comprise: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. Here, the computer-readable storage medium may be any tangible medium that contains or stores a program, and the program may be used by or in combination with an instruction execution system, apparatus, or device.

The computer program code for performing the operations of the invention may be written in one or more programming languages or a combination thereof. The programming language includes object-oriented programming languages-such as Java, Smalltalk, C++, and also includes conventional procedural programming languages-such as "C" language or similar programming languages, in particular, may be Python language suitable for neural network calculation and platform frameworks based on TensorFlow, PyTorch, etc. can be used. The program code may be completely executed on a user computer, partially executed on the user computer, executed as an independent software packet, executed partially on the user computer and partially on a remote computer, or completely executed on the remote computer or a server. In the case of involving a remote computer, the remote computer can be connected to the user computer via any types of networks, such as a local area network (LAN) or a wide area network (WAN), or can be connected to an external computer (for example, via an Internet provided by an Internet service supplier).

A computing device is provided in a sixth embodiment of the present invention. The computing device includes a memory, a processor, and a non-temporary computer readable storage medium stored on the memory and executable on the processor, wherein when executing the program, the processor realizes the method for correcting underwater photon displacement with a single-photon Lidar according to the first aspect, or the depth sounding method using a single-photon Lidar according to the third aspect.

The non-temporary computer readable storage medium and the computing device according to the fifth and the sixth aspects of the invention may be implemented with reference to the content specifically described in the embodiment of the first aspect or the embodiment of the third aspect of the invention, and have the same beneficial effects as the method for correcting underwater photon displacement with a single-photon Lidar according to the embodiment of the first aspect of the invention or the method for correcting underwater photon displacement with a single-photon Lidar according to the embodiment of the third aspect of the invention, and will not be repeated here.

Figure 15:
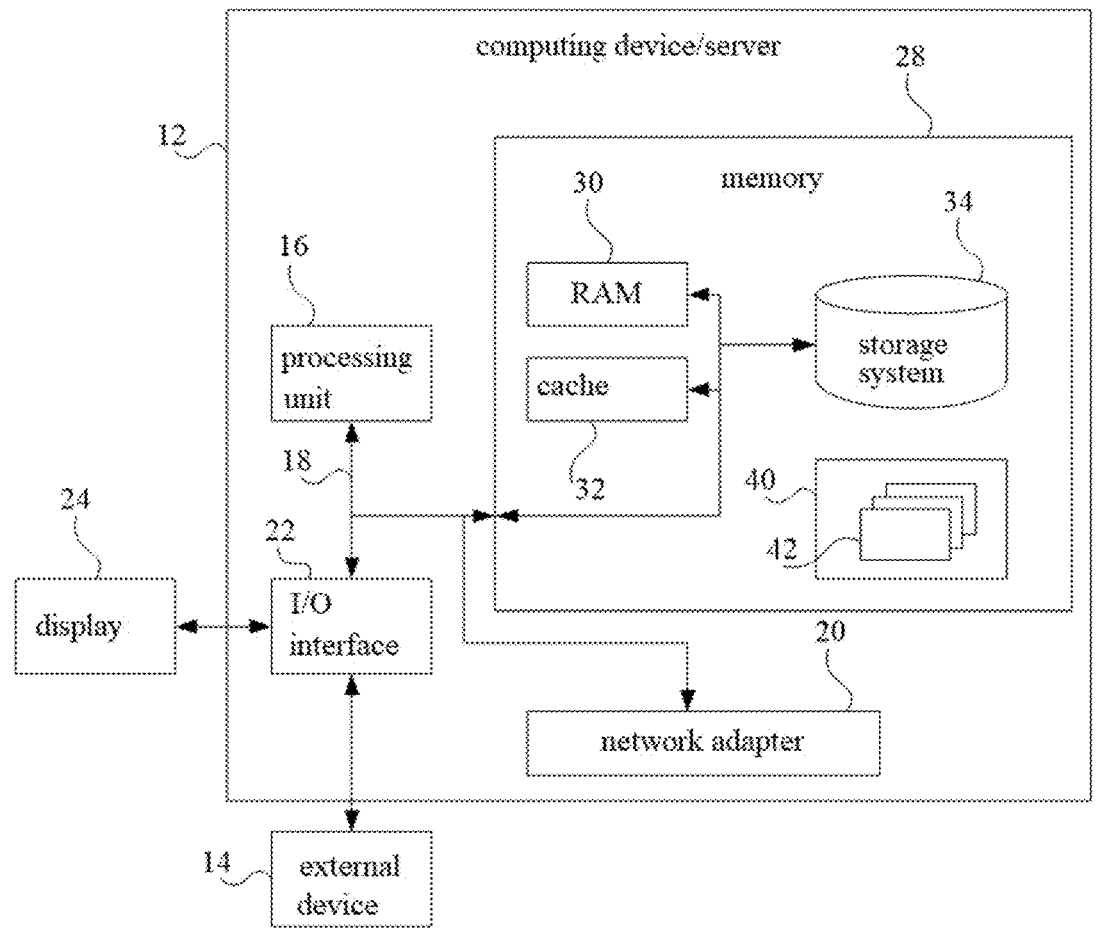
FIG. 15 is a block diagram of an illustrative computing device suitable for realizing the embodiment of the invention.

FIG. 15 is a block diagram of an illustrative computing device suitable for realizing the embodiment of the invention. The computing device 12 shown in FIG. 15 is only an example, and should not bring any limitation to the function and scope of use of the embodiments of the invention.

As shown in FIG. 15, the computing device 12 may be implemented in the form of a general-purpose computing device. The components of the computing device 12 may include, but are not limited to: one or more processors or processing units 16, a system memory 28, and a bus 18 connecting different system components (including the system memory 28 and the processing unit 16).

The bus 18 represents one or more of several types of bus structures, including a memory bus or a memory controller, a peripheral bus, a graphics acceleration port, a processor, or a local bus using any bus structure among multiple bus structures. For example, these architectures include, but are not limited to, industry standard architecture (hereinafter referred to as ISA) buses, micro channel architecture (hereinafter referred to as MAC) buses, enhanced ISA buses, video electronics standards association (hereinafter referred to as: VESA) local buses, and peripheral component interconnection (hereinafter referred to as: PCI) buses.

The computing device 12 typically includes a variety of computer system readable medium. These media may be any available media that can be accessed by the computing device 12, including volatile and non-volatile media, removable and non-removable media.

The memory 28 may include a computer system readable medium in the form of a volatile memory, such as a random access memory (Random Access Memory; hereinafter referred to as RAM) 30 and/or a cache memory 32. The computing device 12 may further include other removable/non-removable, volatile/nonvolatile computer-readable storage media. As only an example, the storage system 34 may be used to read and write non-removable, non-volatile magnetic media (not shown in the figure, and usually referred to as a "hard drive"). Although not shown in FIG. 15, a disk drive for reading and writing to a removable non-volatile disk (such as a "floppy disk"), and optical drives for reading and writing to removable non-volatile optical discs (for example: Compact Disc Read Only Memory (Compact Disc Read Only Memory; hereinafter referred to as: CD-ROM), to digital Video Disc Read Only Memory (hereinafter referred to as: DVD-ROM) or to other optical media may be provided. In these cases, each drive may be connected to the bus 18 through one or more data media interfaces. The memory 28 may include at least one program product, and the program product has a set (for example, at least one) program modules, which are configured to perform the functions of the embodiments of the invention.

A program/utility tool 40 having a set of (at least one) program module 42 may be stored in, for example, the memory 28. Such program modules 42 include, but are not limited to, an operating system, one or more application programs, other program modules, and program data. Each of these examples or some combination may include the implementation of a network environment. The program module 42 generally executes the functions and/or methods in the embodiments described in the invention.

The computing device 12 may also communicate with one or more external devices 14 (such as keyboards, pointing devices, displays 24, etc.), and may also communicate with one or more devices that enable users to interact with the computer system/server 12, and/or may also communicate with any device (such as a network card, modem, etc.) that enables the computer system/server 12 to communicate with one or more other computing devices. Such communication may be performed through an input/output (I/O) interface 22. The computing device 12 may also communicate with one or more networks (such as a local area network (Local Area Network; hereinafter referred to as: LAN), a wide area network (hereinafter referred to as: WAN) and/or a public network, such as the Internet) through a network adapter 20. As shown, the network adapter 20 communicates with other modules of the computing device 12 through the bus 18. It should be noted that although not shown in the figure, other hardware and/or software modules may be used in conjunction with the computing device 12, including but not limited to microcode, device drivers, redundant processing units, external disk drive arrays, RAID systems, disk drives, and data backup storage systems, and so on.

The processing unit 16 executes various functional applications and data processing by running programs stored in the system memory 28, such as implementing the methods mentioned in the foregoing embodiments.

The computing device of the invention may be a server or a terminal device with limited computing power.

Although embodiments of the invention have been shown and described above, it will be understood that the above embodiments are illustrative and are not to be construed as limiting the present disclosure. Changes, modifications, alterations and variations of the above-described embodiments may be made by those skilled in the art.

What is claimed is:

1. A method for correcting underwater photon displacement with a single-photon Lidar, comprising:
   acquiring a pointing angle of a plurality of photons emitted by the single-photon Lidar, and coordinates of a water-surface photon signal and a water-bottom photon signal returned by the plurality of photons emitted by the single-photon Lidar;
   performing a sea wave fitting according to the water-surface photon signal to determine a sea wave model;

during the process of the sea wave fitting, piecewise polynomials and wave geometric models are used;

wherein two-dimensional models of the piecewise polynomial and the wave geometric model are expressed as formulas (1) and (2), and corresponding three-dimensional models are expressed as formulas (3) and (4), wherein $a_i$, $b_i$, $c_i$, $d_i$, $e_i$, $g_i$, $h_i$, $k_i$, $l_i$ respectively represent the polynomial coefficients, an $A_i$, $\omega_i$, $\phi_i$, $\varphi_i$, g respectively represent the amplitude, angular velocity, direction angle, initial phase and gravitational acceleration of each waveform in the wave geometry model, and $H_0$ represents a constant offset caused when the sea level in the geographic coordinate system is a negative value;

wherein the formulas (1), (2), (3) and (4) are expressed by:

$$z = \sum_{i=1}^{n} a_i x^3 + b_i x^2 + c_i x + d_i \qquad (1)$$

$$z = \sum_{i=1}^{n} A_i \cos\left(\frac{\omega_1^2}{g} \cdot x + \varphi_i\right) + H_0 \qquad (2)$$

$$z = \sum_{i=1}^{n} a_i x^3 + b_i y^3 + c_i x^2 y + d_i x y^2 + e_i x^2 + f_i y^2 + g_i xy + h_i x + k_i y + l_i \qquad (3)$$

$$z = \sum_{i=1}^{n} A_i \cos\left[\frac{\omega_1^2}{g}(x \cdot \cos\phi_i + y \cdot \sin\phi_i) + \varphi_i\right] + H_0 \qquad (4)$$

determining an intersection of the plurality of photons and an air-water interface according to coordinates of any water-bottom photon, the pointing angle and the sea wave model;

determining an underwater displacement error of the plurality of photons according to the intersection, the sea wave model and the pointing angle; and correcting the coordinates of the water-bottom photon according to the underwater displacement error.

2. The method for correcting underwater photon displacement with a single-photon Lidar according to claim 1, wherein the step of determining an intersection of the plurality of photons and an air-water interface according to coordinates of any water-bottom photon, the pointing angle and the sea wave model comprises:

constructing a straight line in space according to the coordinates and the pointing angle; and determining an intersection of the straight line in space and the sea wave model as the intersection of the plurality of photons and the air-water interface.

3. The method for correcting underwater photon displacement with a single-photon Lidar according to claim 1, wherein the step of determining an underwater displacement error of the plurality of photons according to the intersection, the sea wave model and the pointing angle comprises:

determining a wave surface slope of the plurality of photons in an along-track direction according to the intersection and the sea wave model; and determining the underwater displacement error according to the wave surface slope and the pointing angle.

4. The method for correcting underwater photon displacement with a single-photon Lidar according to claim 3, wherein the step of determining the underwater displacement error according to the wave surface slope and the pointing angle comprises:

determining an incident angle and a refraction angle of the plurality of photons according to the wave surface slope and the pointing angle; and determining the underwater displacement error according to the refraction angle, the wave surface slope and the pointing angle.

5. The method for correcting underwater photon displacement with a single-photon Lidar according to claim 4, wherein the step of determining an incident angle and a refraction angle of the plurality of photons according to the wave surface slope and the pointing angle comprises:

determining the incident angle according to the wave surface slope and the pointing angle; and determining the refraction angle according to the incident angle based on Snell's Law.

6. The method for correcting underwater photon displacement with a single-photon Lidar according to claim 4, wherein the step of determining the underwater displacement error according to the refraction angle, the wave surface slope and the pointing angle comprises:

determining an original incident photon path and a photon path refracted by water of the plurality of photons emitted by the single-photon Lidar; and determining the underwater displacement error according to a spatial structure relationship among the original incident photon path, the photon path refracted by water, the refraction angle, the wave surface slope and the pointing angle.

7. The method for correcting underwater photon displacement with a single-photon Lidar according to claim 6, wherein the step of determining an original incident photon path and a photon path refracted by water comprises:

determining the original incident photon path according to coordinates of the water-bottom photon and coordinates of the intersection; and determining the plurality of photons path refracted by water according to the original incident photon path based on the refraction formula.

8. A device for correcting underwater photon displacement with a single-photon Lidar, comprising:

an acquisition module, configured to acquire a pointing angle of a photon emitted by the single-photon Lidar, and coordinates of a water-surface photon signal and a water-bottom photon signal returned by the plurality of photons emitted by the single-photon Lidar;

a processing module, configured to perform a sea wave fitting according to the water-surface photon signal to determine a sea wave model; further configured to determine an intersection of the plurality of photons and an air-water interface according to coordinates of any water-bottom photon, the pointing angle and the sea wave model; further configured to determine an underwater displacement error of the plurality of photons according to the intersection, the sea wave model and the pointing angle; and a correction module, configured to correct the coordinates of the water-bottom photon according to the underwater displacement error;

during the process of the sea wave fitting, piecewise polynomials and wave geometric models are used;

wherein two-dimensional models of the piecewise polynomial and the wave geometric model are expressed as formulas (1) and (2), and corresponding three-dimensional models are expressed as formulas (3) and (4), wherein $a_i$, $b_i$, $c_i$, $d_i$, $e_i$, $g_i$, $h_i$, $k_i$, $l_i$ respectively represent the polynomial coefficients, an $A_i$, $\omega_i$, $\phi_i$, $\varphi_i$, g respectively represent the amplitude, angular velocity, direction angle, initial phase and gravitational acceleration of each waveform in the wave geometry model, and $H_0$ represents a constant offset caused when the sea level in the geographic coordinate system is a negative value;

wherein the formulas (1), (2), (3) and (4) are expressed by:

$$z = \sum_{i=1}^{n} a_i x^3 + b_i x^2 + c_i x + d_i \quad (1)$$

$$z = \sum_{i=1}^{n} A_i \cos\left(\frac{\omega_i^2}{g} \cdot x + \varphi_i\right) + H_0 \quad (2)$$

$$z = \sum_{i=1}^{n} a_i x^3 + b_i y^3 + c_i x^2 y + d_i xy^2 + e_i x^2 + f_i y^2 + g_i xy + h_i x + k_i y + l_i \quad (3)$$

$$z = \sum_{i=1}^{n} A_i \cos\left[\frac{\omega_i^2}{g}(x \cdot \cos\phi_i + y \cdot \sin\phi_i) + \varphi_i\right] + H_0. \quad (4)$$

9. A depth sounding method using a single-photon Lidar, comprising:

acquiring coordinates of a water-bottom photon;

correcting the coordinates of the water-bottom photon, comprising:

acquiring a pointing angle of a photon emitted by the single-photon Lidar, and coordinates of a water-surface photon signal and the water-bottom photon signal returned by the plurality of photons emitted by the single-photon Lidar;

performing a sea wave fitting according to the water-surface photon signal to determine a sea wave model;

during the process of the sea wave fitting, piecewise polynomials and wave geometric models are used;

wherein two-dimensional models of the piecewise polynomial and the wave geometric model are expressed as formulas (1) and (2), and corresponding three-dimensional models are expressed as formulas (3) and (4), wherein $a_i$, $b_i$, $c_i$, $d_i$, $e_i$, $g_i$, $h_i$, $k_i$, $l_i$ respectively represent the polynomial coefficients, an $A_i$, $\omega_i$, $\phi_i$, $\varphi_i$, g respectively the amplitude, angular the amplitude, angular velocity, direction angle, initial phase and gravitational acceleration of each waveform in the wave geometry model, and $H_0$ represents a constant offset caused when the sea level in the geographic coordinate system is a negative value;

wherein the formulas (1), (2), (3) and (4) are expressed by:

$$z = \sum_{i=1}^{n} a_i x^3 + b_i x^2 + c_i x + d_i \quad (1)$$

$$z = \sum_{i=1}^{n} A_i \cos\left(\frac{\omega_i^2}{g} \cdot x + \varphi_i\right) + H_0 \quad (2)$$

$$z = \sum_{i=1}^{n} a_i x^3 + b_i y^3 + c_i x^2 y + d_i xy^2 + e_i x^2 + f_i y^2 + g_i xy + h_i x + k_i y + l_i \quad (3)$$

$$z = \sum_{i=1}^{n} A_i \cos\left[\frac{\omega_i^2}{g}(x \cdot \cos\phi_i + y \cdot \sin\phi_i) + \varphi_i\right] + H_0 \quad (4)$$

determining an intersection of the plurality of photons and an air-water interface according to coordinates of any water-bottom photon, the pointing angle and the sea wave model;

determining an underwater displacement error of the plurality of photons according to the intersection, the sea wave model and the pointing angle;

correcting the coordinates of the water-bottom photon according to the underwater displacement error; and determining a depth of a region to be measured according to coordinates of the corrected water-bottom photon signal.

* * * * *